Sept. 25, 1962 H. L. MORGAN 3,056,046

SQUARE WAVE DEVELOPING CIRCUIT USING BACK TO BACK ZENER DIODES AND WITH SERIES INDUCTANCE

Filed Jan. 7, 1959

INVENTOR.
Harvey L. Morgan
BY Mueller & Aichele
Attys.

United States Patent Office
3,056,046
Patented Sept. 25, 1962

3,056,046

SQUARE WAVE DEVELOPING CIRCUIT USING BACK TO BACK ZENER DIODES AND WITH SERIES INDUCTANCE

Harvey L. Morgan, Glendale, Ariz., assignor to Motorola, Inc., Chicago, Ill., a corporation of Illinois Filed Jan. 7, 1959, Ser. No. 785,506
6 Claims. (Cl. 307—88.5)

This invention relates to signal developing apparatus and more particularly to apparatus adapted to convert an alternating current input signal into a square wave output signal displaced in phase therefrom.

In many electronic applications it is desirable to establish a time relation between different electronically controlled events and a sine wave clock or master signal. One way of accomplishing this is by generating one or more square wave output signals from a sine wave alternating current input voltage. It has been difficult to establish an accurate phase relationship between the input and output signals and to develop a square wave output having a suitably short rise time.

In the past, square waves have been generated from sine wave inputs by circuits including a pair of oppositely biased diodes connected in parallel across the alternating current input. However, in such devices the square wave rise time is determined by the time rate of change of voltage of the alternating current input signal so that at low frequencies a very high A.C. voltage is required to obtain good square wave rise time. In addition, such circuits are relatively complex and include relatively many components.

It is an object of the present invention to provide relatively simple and inexpensive apparatus for developing a square wave voltage output having a short rise time.

It is a further object of the invention to provide a square wave generating circuit wherein the rise time of the output is relatively independent of the amplitude of the alternating current input signal.

It is another object of the invention to provide apparatus for generating a square wave voltage output signal displaced in phase by predetermined amount from an alternating current input signal.

A feature of the invention is the provision of a circuit having an input to which an alternating current is applied and a pair of Zener diodes connected with their corresponding electrodes coupled together in so-called back-to-back relation so that a predetermined voltage is developed in either direction thereacross and a square wave output signal is developed across the diode pair.

A further feature of the invention is the provision of a circuit having a predetermined reactance in series between an alternating current input and bidirectional voltage reference means such as a pair of Zener diodes in order to provide a predetermined phase shift between an alternating current input signal and a square wave output signal. A variable resistance may be connected in the circuit to adjust the phase shift.

Figure 1:
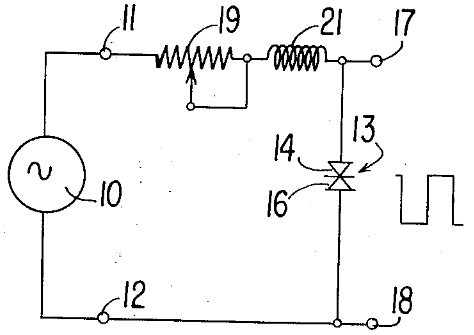
Figure 2:
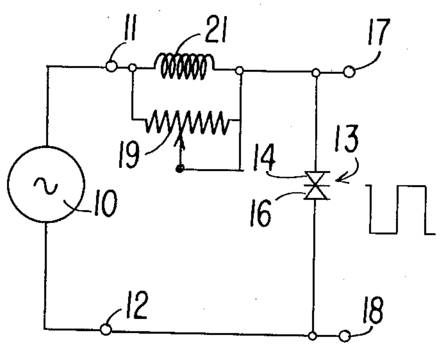
Figure 3:
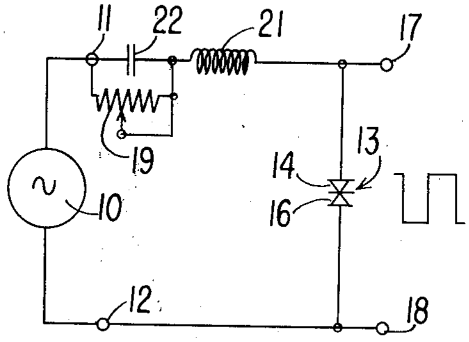
Figure 4:
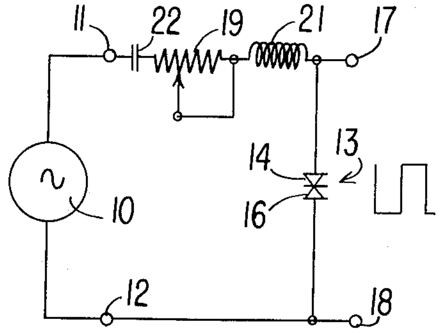

In the accompanying drawings:

FIGS. 1 and 2 are schematic circuit diagrams showing circuits for obtaining a square wave output signal delayed in phase with respect to an alternating current input signal; and FIGS. 3 and 4 are circuit diagrams of alternate embodiments whereby either phase delay or advance may be obtained from the same circuit.

The present invention provides a circuit for converting an alternating current input voltage to a square wave output voltage by connecting a bipotential voltage reference element across the A.C. input and deriving the output across the voltage reference element. The preferred form of the bipotential voltage reference element is a pair of Zener diodes connected in back-to-back series relation, that is, with like electrodes coupled together. A circuit having reactance may be connected in series between the A.C. input and the diode pair. As the potential impressed across the diode pair exceeds a predetermined value, the voltage in excess of this value appears across the reactance of the circuit. Because of the phase difference between current and voltage across the reactance, energy stored therein is released to maintain the potential across the diodes at a predetermined value for a short time after the impressed potential from the A.C. source has fallen below that value. This also is effective to reduce the rise time of the output signal and a satisfactory square wave can be obtained. In addition, the phase of the output square wave signal may be shifted a predetermined amount with respect to the phase of the input. The reactance of the circuit may be provided by an inductance, and such a circuit has the additional advantage of permitting the peak-to-peak voltage of the output square wave to be substantially the same as that of the input signal.

In the embodiment of the invention illustrated in FIG. 1, an alternating current source 10 is provided with terminals 11 and 12 and supplies an input voltage of fluctuating polarity, normally in the form of a sine wave although it would be understood that the invention is not limited to use of a sine wave input. A bipotential voltage reference element 13, composed of Zener diodes 14 and 16, is coupled to the terminals 11 and 12. The Zener diodes are connected with like electrodes connected together or in so-called back-to-back series relation. The element 13 thus provides a fixed maximum reference voltage to be derived across the output terminals 17 and 18 and is bidirectional in the sense that voltage of either polarity may be derived.

A variable resistor 19 and an inductance element 21 are connected in series between one of the input terminals 11 and the voltage reference element 13. It is well known that the current through the inductance 21 will lag the applied voltage by 90°. Thus, when current conduction across element 13 ceases, the full amplitude of the A.C. input applied across terminals 11 and 12 is across the inductance 21 and the reference element 13. The characteristics of the Zener diodes 14 and 16 are such that current reversal could take place only when the voltage across the serially connected diodes equals or exceeds the breakdown voltage of the diode connected to oppose current flow. The sum of the voltage drops across the inductance 21 and the reference element 13 must equal the voltage impressed across terminals 11 and 12 (neglecting for the moment the series resistance 19). The relationship $$E_L = L\frac{dI}{dt}$$

(where L is the inductance of element 21, $E_L$ is the voltage drop across it, I is current and $t$ is time) must be satisfied, and as a result a switching action across the element 13 takes place generating a square wave output between terminals 17 and 18. Square waves generated by this apparatus are characterized by a relatively short rise time, that is, the slope of the waveform curve approaches 90° with respect to the time axis. This is made possible by the lag between the voltage and current through the inductance 21 which provides an effective reserve of energy to maintain the output potential between terminals 18 and 19 at a fixed level for a short period after the applied input voltage has dropped below that level. Then, as the applied voltage changes further, switching action across the reference element 13 takes place practically instantaneously. Rise times on the order of one microsecond have been obtained from a 667 cycle per second sine wave input.

A particular advantage of the circuit as shown in FIG. 1 is that it produces a square wave output of substantially the same amplitude as the alternating current input. This is because substantially all of the applied voltage appears across the reference voltage element 13 and the inductance 21, with that appearing across the inductance being effectively recovered as output across terminals 17 and 18. The resistor 19 controls the variation of relative phase between the input sine wave and the output square wave. Thus, in a particular circuit the value of the resistor 19 can be adjusted to provide for phase lags up to almost 90°.

FIG. 2 illustrates an alternative circuit for obtaining phase lag with the phase controlling resistor being connected in parallel with the inductance 21. The operation of this circuit is substantially the same as that of FIG. 1.

FIGS. 3 and 4 illustrate two applications of the invention for generating a square wave output which will either lag or lead the applied voltage. These circuits include a capacitor 22 in series with inductance 21, with the potentiometer 19 being connected either in parallel with the capacitance 22 or in series with these elements. In these circuits either the inductor 21 or the capacitor 22 can be made to predominate at the frequency of the input signal so that the overall reactance will be either inductive or capacitive and the output square wave will lag or lead, respectively. The resistor 19 across capacitor 22 in FIG. 3 varies the effective value of the capacitor to change the reactance of the circuit, so that the circuit can be either resonant, inductive or capacitive at the frequency involved. The phase of the output wave form with respect to the input waveform may be controlled by adjusting the resistor 19 of FIG. 4 to provide either lead or lag.

The circuits of FIGS. 3 and 4 can be used to provide a square wave with a phase advance without the use of inductance 21. In such case the output voltage will be reduced as there is no inductance for supplying energy during the switching action.

The present invention therefore provides relatively simple square wave generating apparatus adapted to produce a waveform of good rise time from a standard alternating current input signal. The phase relation between the input and output signals is readily adjustable by variations of a resistance element. In applications wherein an inductance is included in the circuit it is possible to obtain an output waveform of substantially the same amplitude as the input wave.

I claim:

1. Apparatus for deriving a square wave output voltage signal of substantially the same amplitude as an alternating current input voltage signal including in combination, input terminals adapted to be coupled to an alternating current source, a bipotential voltage reference element comprising a pair of Zener diodes coupled in back-to-back relation, an inductance element connected in series with said reference element across said input terminals, and a pair of output terminals connected across said reference element across which a square wave output signal is derived, said inductance element storing energy therein and releasing the same so that the square wave output signal has substantially the same voltage amplitude as the alternating current input signal.

2. Apparatus for deriving a square wave voltage output signal retarded in phase with respect to an alternating current input signal, said apparatus including in combination, input terminals adapted to be coupled to an alternating current source, a bipotential voltage reference element comprising a pair of Zener diodes coupled in back-to-back relation connected across said input terminals, an inductance element connected in series between said reference element and one of said input terminals, a variable resistance element connected in series between said reference element and said one of said input terminals, and a pair of output terminals across which a square wave output signal is derived connected across said reference element, said inductance element causing the output signal to be retarded in phase with respect to the input signal, and said variable resistance element controlling the extent of such change in phase of said output signal.

3. Apparatus for developing a square wave output voltage signal displaced in phase by a predetermined amount from an alternating current input voltage signal, said apparatus including in combination, input terminals for connection to an alternating current source, bipotential voltage reference means comprising a pair of Zener diodes coupled in back-to-back relation, inductance means and capacitance means connected in series forming a resonant circuit, means including resistance means connecting said reference means and said resonant circuit in series across said input terminals, and a pair of output terminals connected across said reference means, across which the square wave output signal is derived, said resonant circuit storing energy and releasing the same so that the output signal has substantially the same amplitude as the input signal, and the tuning of said resonant circuit controlling the reactance thereof to thereby control the phase displacement of said output signal.

4. Apparatus for developing a square wave output voltage signal displaced in phase by a predetermined amount from an alternating current input voltage signal, said apparatus including in combination, input terminals adapted to be coupled to an alternating current source, a bipotential voltage reference element comprising a pair of Zener diodes coupled in back-to-back relation connected across said input terminals, an inductive reactance element and a capacitative reactance element connected in series, said reactance elements having values selected such that the combined effect thereof is reactive at the frequency of the alternating current input signal, means including a variable resistance element connected across one of said reactance elements, and a pair of output terminals connected across said reference element across which the square wave output signal is derived, said variable resistance element controlling the combined reactive effect of said reactance elements to thereby control the phase displacement of said output signal.

5. Rectangular wave voltage developing apparatus including in combination, input terminals for connection to an alternating current source, bipotential voltage reference means including a pair of Zener diodes connected in series with each other, with the diodes being connected in opposite polarities with respect to current flow through the diodes in series, inductance means connected in series with said bipotential voltage reference means between said input terminals, and output circuit means connected across said bipotential voltage reference means for deriving the rectangular voltage wave thereacross, said inductance means having a value to produce a displacement in phase of said rectangular voltage wave with respect to the wave from the alternating current source.

6. Rectangular wave voltage developing apparatus including in combination, input terminals for connection to an alternating current source, bipotential voltage reference means including a pair of diodes connected in opposite polarities and each conducting when the potential applied to said reference means reaches a predetermined value, inductance means connected in series with said bipotential voltage reference means between said input terminals, said voltage reference means establishing a predetermined potential of each polarity in response to the voltage wave from an alternating current source, and output circuit means connected across said bipotential voltage reference means for deriving a rectangular voltage wave thereacross, said inductance means including means for controlling the effective value thereof to thereby control the displacement in phase of said rectangular voltage wave with respect to the wave from the alternating current source.

References Cited in the file of this patent

UNITED STATES PATENTS

| | | |
|---|---|---|
| 2,789,254 | Bodle et al. | Apr. 16, 1957 |
| 2,867,735 | Kaufman | Jan. 6, 1959 |
| 2,947,883 | Welch | Aug. 2, 1960 |